US00RE36527E

United States Patent [19]

Arntz

[11] E Patent Number: Re. 36,527

[45] Reissued Date of Patent: Jan. 25, 2000

[54] APPARATUS FOR REMOVING SOLID AND VOLATILE CONTAMINANTS

[75] Inventor: Thomas L. Arntz, Spotsylvania, Va.

[73] Assignee: Premo Lubrication Technologies, Inc., Tampa, Fla.

[21] Appl. No.: 08/667,694

[22] Filed: Jun. 21, 1996

Related U.S. Patent Documents

Reissue of:

[64] Patent No.: 5,322,596
Issued: Jun. 21, 1994
Appl. No.: 07/998,225
Filed: Dec. 30, 1992

[51] Int. Cl.[7] ..... B01D 1/00; B01D 27/08; C10G 31/09

[52] U.S. Cl. ..... 196/46.1; 196/115; 196/137; 202/176; 210/180; 210/181; 210/261; 210/262; 203/DIG. 16

[58] Field of Search ..... 196/46.1, 115, 196/137; 202/176; 203/DIG. 16; 210/180, 181, 261, 262

[56] References Cited

U.S. PATENT DOCUMENTS

| | | | |
|---|---|---|---|
| 1,237,738 | 8/1917 | Allen . | |
| 1,718,800 | 6/1929 | Schwalge | 210/180 |
| 2,274,113 | 2/1942 | White | 210/131 |
| 2,425,377 | 8/1947 | La Brecque | 196/16 |
| 2,635,759 | 4/1953 | Schwalge | 210/122.5 |
| 2,785,109 | 3/1957 | Schwalge | 196/15 |
| 2,839,196 | 6/1958 | Schwalge | 210/180 |
| 2,858,026 | 10/1958 | Lorimer | 210/444 |
| 3,550,781 | 12/1970 | Barrow | 210/180 |
| 3,616,885 | 11/1971 | Priest | 196/128 |
| 3,756,412 | 9/1973 | Barrow | 210/180 |
| 3,859,975 | 1/1975 | Hines | 123/196 |
| 3,912,631 | 10/1975 | Turman | 210/136 |
| 3,915,860 | 10/1975 | Priest | 210/136 |
| 4,006,084 | 2/1977 | Priest | 210/180 |
| 4,066,559 | 1/1978 | Rohde | 252/10 |
| 4,093,548 | 6/1978 | Sterkenburg | 210/180 |
| 4,115,201 | 9/1978 | Malec | 196/46.1 |
| 4,146,475 | 3/1979 | Forsland | 210/71 |
| 4,189,351 | 2/1980 | Engel | 196/115 |
| 4,227,969 | 10/1980 | Engel | 196/115 |
| 4,289,583 | 9/1981 | Engel | 196/115 |
| 4,297,212 | 10/1981 | Padgett | 210/168 |
| 4,337,119 | 6/1982 | Donahue | 196/46 |
| 4,338,189 | 7/1982 | Johnson | 210/180 |
| 4,349,438 | 9/1982 | Sims | 210/180 |
| 4,354,946 | 10/1982 | Warlick | 210/774 |
| 4,369,110 | 1/1983 | Picek | 210/180 |
| 4,443,334 | 4/1984 | Shugarman | 210/168 |
| 4,585,924 | 4/1986 | Pakula | 219/205 |
| 4,717,474 | 1/1988 | Sims | 210/180 |
| 4,753,724 | 6/1988 | Womble | 210/180 |
| 4,830,745 | 5/1989 | van der Meulen | 210/168 |
| 4,943,352 | 7/1990 | Lefebvre | 196/46 |
| 5,198,104 | 3/1993 | Menyhert | 210/149 |
| 5,242,034 | 9/1993 | De Paul | 184/6.22 |

FOREIGN PATENT DOCUMENTS

| | | |
|---|---|---|
| 155839A2 | 9/1985 | European Pat. Off. . |
| 547896A2 | 6/1993 | European Pat. Off. . |
| 469087 | 7/1937 | United Kingdom . |
| 1337684 | 11/1973 | United Kingdom . |
| 1424625 | 2/1976 | United Kingdom . |
| 2070953 | 9/1981 | United Kingdom . |
| 8401112 | 3/1984 | WIPO . |
| 8701609 | 3/1987 | WIPO . |
| 9202287 | 2/1992 | WIPO . |

*Primary Examiner*—Nina Bhat
*Attorney, Agent, or Firm*—Joseph C. Mason, Jr.; Dennis G. LaPointe

[57] ABSTRACT

A combination filter and evaporator unit for use in small engine applications includes a filter member that is screw threadedly engaged to the evaporator unit to facilitate replacement of filter media as needed. The design of the unit constrains incoming oil to flow first through the filter media and then to an evaporation chamber. A central hub and a bottom wall of the evaporation chamber are directly heated by a heating element, and the evaporation chamber is closed by an imperforate lid so that heat loss is inhibited.

19 Claims, 4 Drawing Sheets

APPARATUS FOR REMOVING SOLID AND VOLATILE CONTAMINANTS

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates, generally, to devices for use in automotive and other small engines that remove particles and volatiles from the oil used in such engines.

2. Description of the Prior Art

Theoretically, oil used to lubricate engine parts should last forever because the oil itself never breaks down. However, there are two sources of contamination that destroy the effectiveness of oil as a lubricant: abrasive particulate matter and volatiles such as moisture or uncombusted fuel. Accordingly, inventors have developed filter means for removing particulate matter and evaporator means for removing moisture and other volatiles that degrade the effectiveness of the oil.

Devices have also been developed that combine those two functions. For example, U.S. Pat. No. 4,189,351 to Engel shows a combination filter and evaporator unit. Oil to be filtered to remove particulate matter therefrom and to be heated in an evaporation chamber to remove volatiles therefrom is first introduced into a canister filled with filter material. After flowing through the filter material, the oil is introduced into an evaporator chamber where it is spread into a thin layer and heated to enhance its evaporation. A vent allows the evaporated volatiles to escape into the atmosphere.

There are two primary drawbacks to the above-described device. The evaporation is inefficiently performed because the heating element for supplying heat to the evaporation chamber is positioned in the closure means for the device and thus the heat of evaporation must be supplied through radiated heat, and the device is too large to fit under the hood of an automobile.

The inefficient heating problem was solved by a device shown in U.S. patent Ser. No. 07/667,949 to Menyhert, now U.S. Pat. No. 5,198,104. In that device, the heating element is placed in the evaporation plate where the heat is needed and the bulky, heat radiating lid of the Engle device is eliminated. However, said device is also too large to fit under the hood of an automobile. Moreover, the design of both earlier devices is such that changing of the filter material is somewhat difficult. More particularly, the filter media in both devices is positioned in a canister that is secured to the evaporation plate. Thus, at least partial disassembly of such devices is required when the filter media is replaced.

Thus, there remains a need for a combination filter and evaporator apparatus that is small enough for use in automotive and other small engine applications. Moreover, there is a need for a design that enables filter media replacement in the absence of unit disassembly. However, at the time the present invention was made, it was not obvious to those of ordinary skill in this art how those needs could be fulfilled, in view of the prior art as a whole.

SUMMARY OF THE INVENTION

The longstanding but heretofore unfulfilled need for a combination filter and evaporator device of small size having means facilitating filter media replacement is now fulfilled by a construction that includes a screw threadedly engaged external filter housing and which is only about four and one-half inches in diameter.

The design of the novel apparatus constrains oil entering the unit to flow first into the filter housing and secondly into the evaporation chamber of the unit. An adaptor connects the filter housing to the evaporator unit. The filter housing has a hollow, cylindrical main body that holds the filter media and has a recess formed in a top wall thereof that is threaded for screw threaded engagement with the adaptor. Thus, when the filter media becomes ineffective to remove further particulate contaminates, the filter housing is simply unscrewed from the adaptor and a new filter is installed; no disassembly of the device is required.

A small metering opening is formed in the adaptor to allow oil exiting the filter housing to enter the evaporator unit. In a preferred embodiment, the diameter of the opening is selected so that oil may flow therethrough at a rate of about five or six gallons per hour, although other flow rates are of course within the scope of this invention.

As the oil flows through the metering opening, it is introduced into the evaporation chamber through multiple passageways formed in chimneys of the type shown in both of the above-mentioned patents, and thereafter spread thinly over the floor of the evaporation chamber; said chamber is directly heated in accordance with the teachings of the above-mentioned Menyhert patent. The lid of the present apparatus differs from the lid of the device shown in said patent, however, in that the earlier lid has an opening formed therein to accommodate a central post of the evaporation plate that receives the heating element. The present design includes an imperforate lid to reduce heat loss from the evaporation chamber and the lid does not engage said central post. Thus, both the construction of the device and its efficiency are improved.

Thus it is understood that a primary object of this invention is to advance the art of combination filter and evaporator units by providing a device with an easily replaceable filter means and a more efficient evaporation means.

Another important object it to advance said art by providing a device that is small enough to be used in automotive, truck, and other small engine applications.

These and other important objects, features and advantages of the invention will become apparent as this description proceeds.

The invention accordingly comprises the features of construction, combination of elements and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

Figure 2:
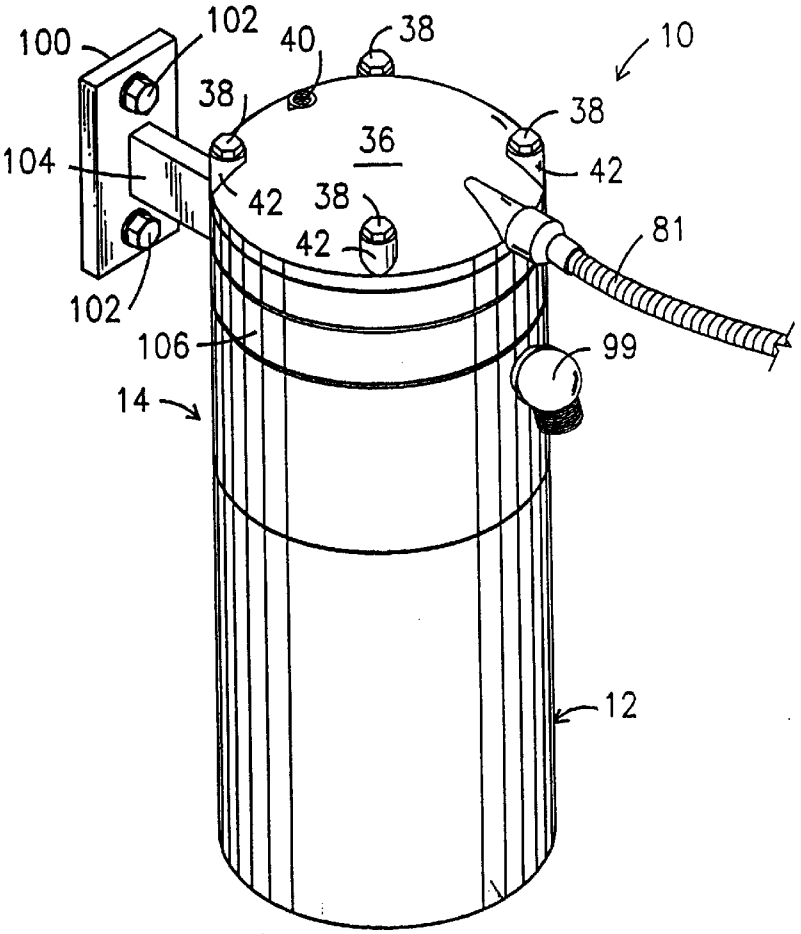
FIG. 2 is a perspective view of the device when assembled, and showing the filter means attached thereto.
Figure 1:
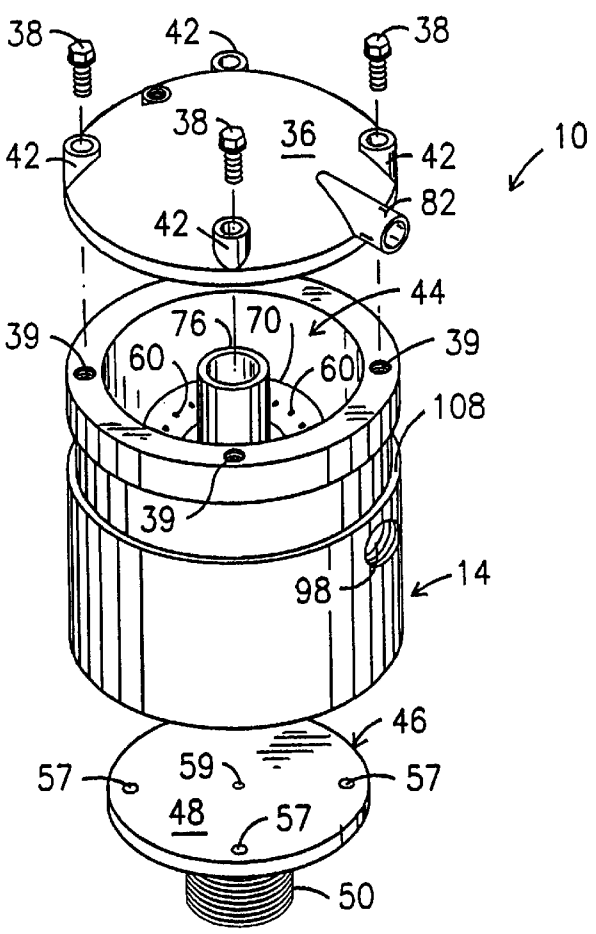
FIG. 1 is an exploded perspective view of the novel device, but with the filter means attachable thereto not shown.
Figure 3:
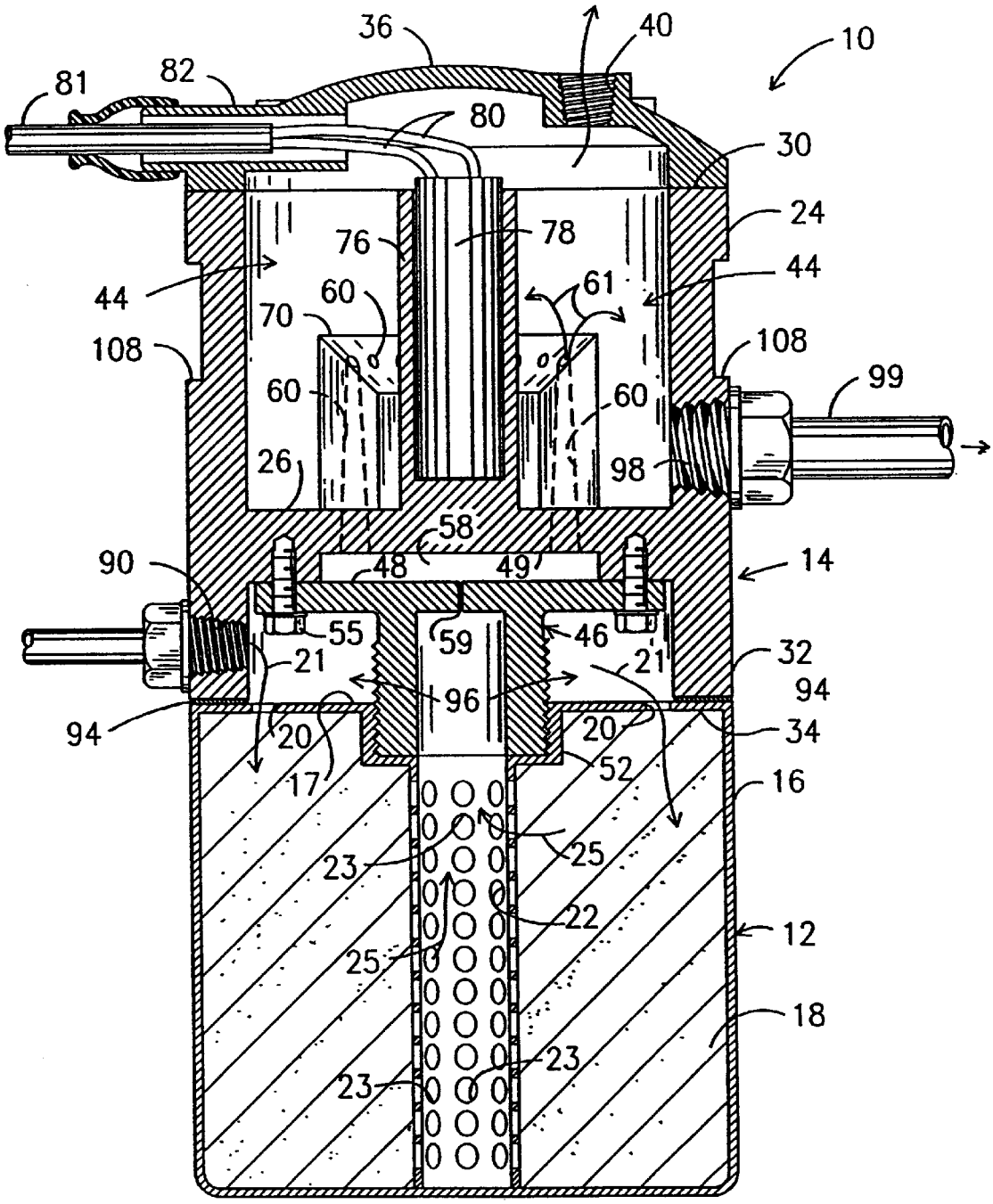
FIG. 3 is a longitudinal sectional view of the parts shown in FIG. 2.

Referring now to FIGS. 1–3, it will there be seen that an exemplary embodiment of the invention is denoted as a whole by the reference numeral 10.

Fluid reclamation apparatus 10 includes a filter means, generally denoted 12, (FIGS. 2 and 3) and an evaporator means, generally denoted 14. In a preferred embodiment, both the filter means 12 and the evaporator means 14 are of cylindrical configuration and share a common diameter, but differing shapes and sizes for both of said parts are within the scope of this invention. Solids are removed from the fluid to be reclaimed by filter means 12, and volatiles are removed therefrom by evaporator means 14. It should be observed from the outset that filter means 12 is readily detachable from evaporator means 14 and that no disassembly of evaporator means 14 is required when filter means 12 is changed.

Filter means 12 has a hollow main body 16, a filter media 18 positioned within said hollow main body, a plurality of openings 20 formed in top wall 17 thereof that collectively provide the filter inlet, and a central outlet passageway 22. Fluid entering inlets 20, as indicated by directional arrows 21, must pass through media 18 before entering outlet passageway 22; the filter media is selected so that the size of particles entering said passageway 22 will be no larger than one angstrom. Apertures 23 formed in the cylindrical side walls of outlet passageway 22 permit the filtered oil to enter said passageway 22, as indicated by directional arrows 25.

Figure 6:
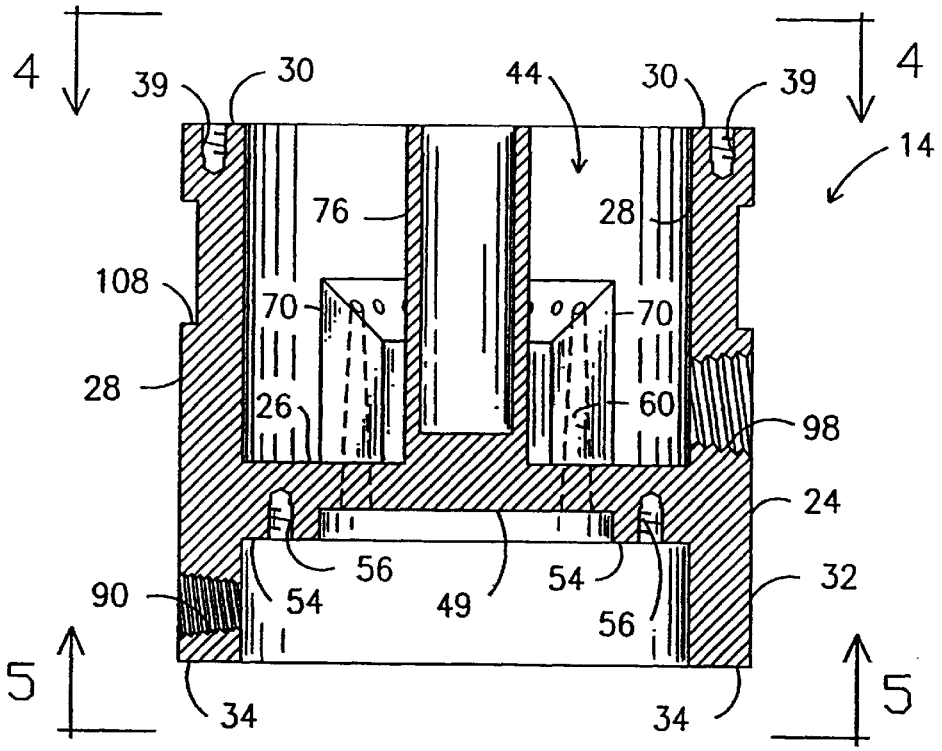
FIG. 6 is a sectional view taken along line 6—6 in FIG. 4.
Figure 7:
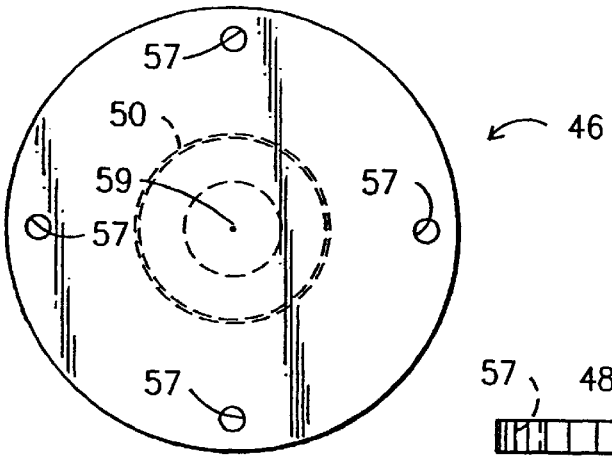
FIG. 7 is a top plan view of the adaptor means that interconnects the evaporator and the filter means.
Figure 8:
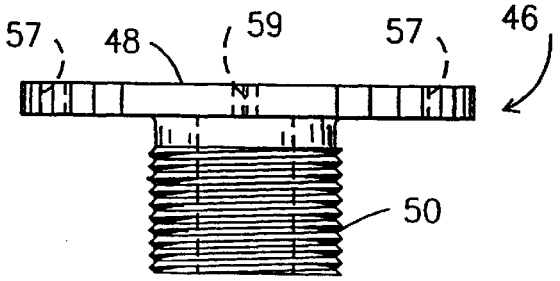
FIG. 8 is a side elevational view of said adaptor.

As best shown in FIGS. 3 and 6, evaporator means 14 includes canister 24 having a bottom wall 26, and upper side walls 28 mounted about the periphery thereof and projecting upwardly therefrom to form an open top; the uppermost end of the upwardly projecting sidewalls is denoted 30.

Canister 24 further includes lower sidewalls 32 mounted about the periphery of bottom wall 26 and depending therefrom, and an open bottom. The lowermost end of the depending sidewalls is denoted 34.

Closure means 36 closes the open top of said canister. Screw members, collectively denoted 38, (FIG. 2) enable facile removal and reattachment of said closure means, and vent 40 performs the function expressed by its name. The uppermost ends 30 of upwardly projecting side walls 28 are tapped as at 39 in FIG. 6 to receive said screws 38, as are bosses 42 formed in lid 38. Numerous other means for releasably attaching lid 36 to canister 24 are within the scope of this invention.

Evaporation chamber 44 is defined within said canister, said closure means 36 defining the upper limit of said evaporation chamber, said bottom wall 26 defining the lower limit thereof, and said upwardly projecting side walls 24 defining the outermost periphery thereof.

Adaptor 46, shown in FIGS. 1, 3, 7, and 8, interconnects evaporator means 14 and filter means 12; it includes a flat main body part 48 and a tubular neck 50 that depends therefrom. Tubular neck 50 is adapted to releasably engage a recess 52 (FIG. 3) that is formed in the center of the top wall 17 of said filter means. More particularly, neck 50 is externally threaded and recess 52 is internally threaded, but any suitable quick release fastening means could be employed to interconnect adaptor neck 50 and filter neck 52. It should also be observed that filter means 12 could also have a bottle shape, i.e., an externally threaded, upwardly protruding neck could replace recess 52, and adaptor 46 could have an internally threaded recess in lieu of neck 50.

An annular step 54 (FIG. 6) is formed in bottom wall 26, and plural circumferentially spaced, internally threaded bores 56 are formed therein. Cooperatively spaced bores 57 are formed near the peripheral edge of adaptor main body 46, and screws 55 secure said adaptor to said step 54 as depicted in FIG. 3.

A recess 49 (FIG. 6) is formed in the lower surface of bottom wall 26, radially inwardly of said annular step. Thus, a reservoir 58 (FIG. 3) is defined between canister bottom wall 26 and adaptor main body 48 when said main body is secured to annular step 54. More particularly, said reservoir is formed because adaptor main body 48 is flat and overlies said recess.

Metering bore 59 is formed in said adaptor main body, centrally thereof, and provides fluid communication between filter outlet passageway 22 of filter means 12 and reservoir 58.

A plurality of openings, collectively denoted 60, are formed in bottom wall 26 of canister 24. These openings admit fluid in reservoir 58 into evaporation chamber 44 as indicated by the directional arrows 61 in FIG. 3.

Figure 4:
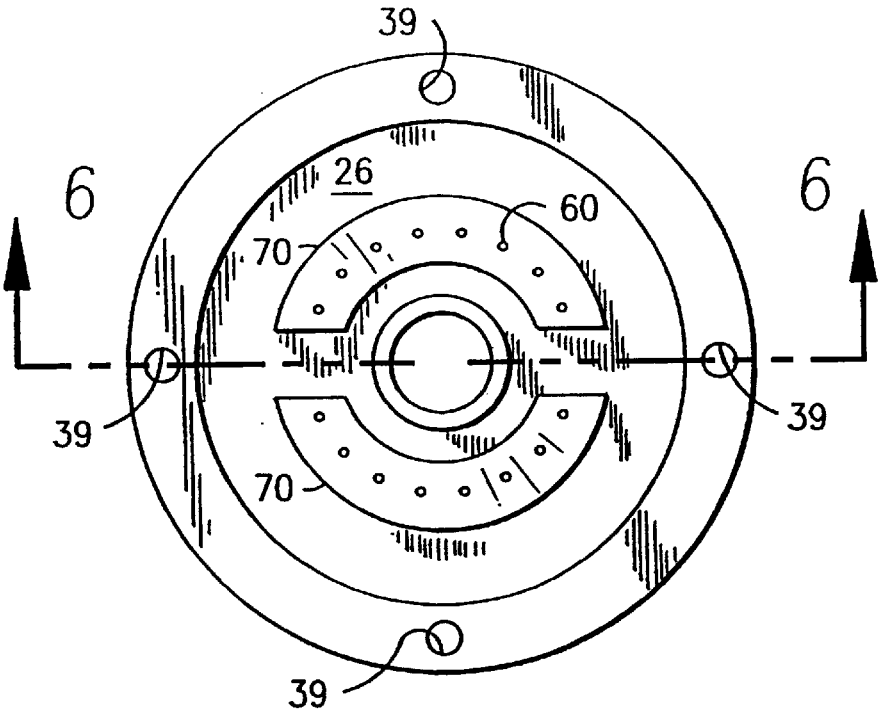
FIG. 4 is a top plan view of the evaporator means when the closure means is removed therefrom, said view being taken along line 4—4 in FIG. 6.
Figure 5:
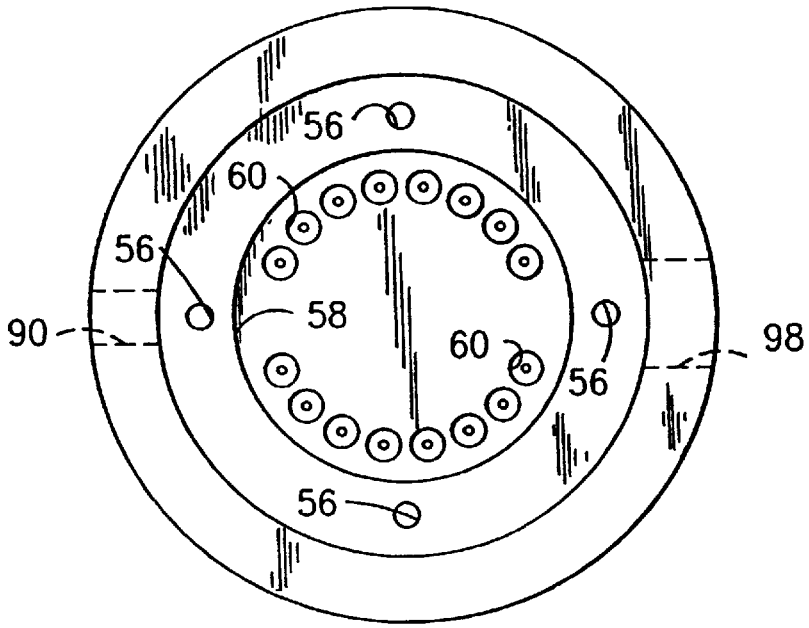
FIG. 5 is a bottom plan view of the evaporator means when the filter means is removed therefrom, said view being taken along line 5—5 in FIG. 6.

More particularly, openings 60 are elongate, tapered bores formed in upstanding, semicircular in configuration chimney members 70 that are diametrically opposed to one another as best shown in FIG. 4. It should be understood that openings 60 formed in bottom wall 26 and the bores 60 formed in said chimney members are confluent with one another and are the same part because said chimney members are formed integrally with said bottom wall.

An upwardly projecting central hub 76 is also formed integrally with bottom wall 26; it has a hollow construction, and slidably receives a heating element 78 (FIG. 3) therewithin. Note that heating element 78 heats said central hub and bottom wall 26 directly, and that electrical leads 80 enter closure means 36 through a tubular opening 82 formed in a side edge of the closure means. Said leads 80 interconnect the heating element and an external source of electrical power, not shown. As shown in FIGS. 1 and 2, tubular opening 82 is formed by a tubular member identified by the same reference numeral, said tubular member 82 being formed integrally with closure means 36. Said tubular member 82 extends radially outwardly from said closure means in coplanar relation thereto. Sheath 81 that houses leads 80 is coupled to tubular member 82 as best shown in FIGS. 2 and 3.

Insert members, not shown, may be provided as well to increase the surface area of the surface over which the oil flows; they are positioned between the central hub 76 and chimneys 70.

Fluid to be reclaimed enters apparatus 10 through canister inlet 90 which is formed in lower sidewalls 32 of canister 24, as best understood in connection with FIG. 3. A constraining means for constraining fluid to be reclaimed to flow from said inlet 90 into the hollow interior of filter means 12, through filter media 18 contained therewithin, through metering bore 60 via filter means outlet 22 into reservoir 58 and into evaporation chamber 44 via said plurality of bores 60 formed in bottom wall 26 is provided by the respective structures of and the means of attachment of said filter means 12 and said canister 24.

More particularly, top wall 17 of filter means main body 16 abuttingly engages the lowermost ends 34 of depending side walls 32 when said filter means engages adaptor 46, and a gasket means 94 (FIG. 3) is disposed between said top wall 17 and said lowermost end 34 of said depending side walls 32. This arrangement of parts creates an enclosed space 96 so that when fluid under pressure is introduced into inlet means 90, the only path of travel open to said incoming fluid is as indicated by the directional arrows denoted 21, i.e., the fluid must enter filter inlets 20, flow through filter media 18, and exit said filter through outlet passageway 22.

The filtered fluid then passes through metering opening 60 into reservoir 58 and onto bottom wall 26 of the evaporator means through bores 60 formed in chimneys 70, as aforesaid. After the volatiles have been vented through vent 40, the filtered and evaporated, i.e., reclaimed oil, exits evaporation chamber 44 through port 98 and tubing 99 returns said reclaimed oil to the engine. A pressure differential created by engine operation ensures that oil will always flow into unit 10 at inlet 90, which is below bottom wall 26, and exit the unit through said outlet port 98, which is above said bottom wall.

Clearly, a spent filter 12 is easily detached from neck 50 of adaptor 46 and a new filter is just as easily installed. No part of canister 24 requires disassembly when the filter is changed.

Assembly 10 may be mounted to or near an engine in many different ways. FIG. 2 shows a bracket 100 in the form of a flat plate that is mounted to a wall near an engine by bolts 102. A rigid arm is formed integrally with said flat plate 100, projects radially therefrom, and engages the opposite ends of a flat, circular band 106 that encircles upper side walls 28; conventional means, not shown, are provided to tighten said band about said side walls 28. Annular, band-receiving recess 108 is preferably formed in said side walls to prevent the band from slipping.

As a practical matter, additional oil may need to be added due to the loss of oil retained within the filter media 18 at the time the filter means 12 is changed, but an engine equipped with the novel assembly 10, known commercially as the PREMO PLUS, never requires an oil change.

This invention is clearly new and useful. Moreover, it was not obvious to those of ordinary skill in this art at the time it was made, in view of the prior art considered as a whole as required by law.

It will thus be seen that the objects set forth above, and those made apparent from the foregoing description, are efficiently attained and since certain changes may be made in the above construction without departing from the scope of the invention, it is intended that all matters contained in the foregoing construction or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described, What is claimed is:

1. A fluid reclamation device, comprising:

a filter means having a hollow main body, a filter media positioned within said hollow main body, an inlet, and an outlet;

a canister having a hollow interior;

said hollow interior providing an evaporation chamber;

an adaptor means for detachably securing said filter means to said canister so that said filter means may be replaced as needed without disassembly of said canister;

fluid passage means for enabling fluid to flow from said filter means into said evaporation chamber defined by said canister;

said canister having a bottom wall, upper side walls mounted about the periphery thereof and projecting upwardly therefrom, an open top, lower sidewalls mounted about the periphery of said bottom wall and depending therefrom, and an open bottom;

said filter means closing said open bottom;

a substantially imperforate closure means for closing said open top of said canister, said closure means defining an upper limit of said evaporation chamber, said bottom wall defining a lower limit thereof, and said side walls defining an outermost periphery thereof; [and]

[an annular step formed in a lower surface of said bottom wall and a recess formed in said lower surface radially inwardly of said annular step.]

*said adaptor means disposed in abutting relation to an exterior surface of said bottom wall; and*

*a reservoir formed between said exterior surface of said bottom wall and said adaptor means.*

[2. The apparatus of claim 1, further comprising a reservoir defined by said recess when said adaptor is secured to said annular step in overlying relation to said recess.]

3. The apparatus of claim [2], *1* further comprising a metering bore formed in said adaptor *means* for providing fluid communication between the hollow interior of said filter means and said reservoir.

4. The apparatus of claim 3, further comprising a plurality of openings formed in said bottom wall of said canister for admitting fluid in said reservoir into said evaporation chamber.

5. The apparatus of claim 4, further comprising a canister inlet means formed in said lower sidewalls for introducing fluid to be reclaimed into said hollow interior of said filter means.

6. The apparatus of claim 5, further comprising constraining means for constraining fluid to be reclaimed to flow into said hollow interior of said filter means via said canister inlet, through said filter means inlet, through said filter media contained within said filter means, through said metering bore via said filter means outlet, into said reservoir, and into said evaporation chamber via said plurality of openings formed in said bottom wall of said canister.

7. The apparatus of claim 6, wherein said adaptor *means* further includes a tubular part that depends therefrom, and wherein said filter means is adapted to releasably engage said tubular part to facilitate replacement of said filter means.

8. The apparatus of claim 7, wherein said filter means main body has a top wall that abuttingly engages lowermost ends of said canister depending walls when said filter means engages said adaptor *means*.

9. The apparatus of claim 8, further comprising a gasket means disposed between said top wall of said filter means main body and said lowermost ends of said depending walls when said filter means engages said tubular part of said adaptor *means* to prevent leakage of fluid when fluid to be reclaimed is introduced into said canister inlet means.

10. The apparatus of claim 9, further comprising an upwardly projecting, hollow central hub formed integrally with said bottom wall[,].

11. The apparatus of claim 10, further comprising a [a] heating element disposed within the hollow interior of said hollow central hub.

12. The apparatus of claim 11, further comprising a plurality of chimney members formed integrally with said bottom wall, and a plurality of bores being formed in said chimney members so that fluid exiting said chimney members flows in a thin film over side walls of said chimney members and over said bottom wall, thereby enhancing evaporation of volatile contaminants in said fluid.

13. A fluid reclamation device, comprising:

a canister having an open top, a bottom wall, upwardly projecting side walls integral with said bottom wall, and depending side walls integral with said bottom wall;

a removable closure means for closing said open top of said canister;

an evaporation chamber defined by a space between said closure means, said bottom wall, and said upwardly projecting side walls;

said closure means including vapor outlet means for venting vapor from said evaporation chamber;

said canister including outlet means formed in said upwardly projecting side walls for allowing fluid to flow out of said evaporation chamber;

a chimney means formed integrally with said bottom wall, said chimney means projecting upwardly therefrom toward said open top and extending into said evaporation chamber;

a passageway means formed in said chimney means so that fluid exiting said chimney means flows in a thin film over side walls of said chimney means and over said bottom wall, thereby enhancing evaporation of volatile contaminants in said fluid;

said chimney means comprising a pair of semicircular in configuration chimney members that are positioned in concentric relation to a center of said bottom wall;

said passageway means extending through said bottom wall;

a filter housing having an inlet means and an outlet means;

said filter housing including a filter media therein;

an adaptor means for interconnecting said filter housing and said canister;

[a recess formed in a lower surface of said bottom wall;]

said adaptor *means* being secured to said bottom wall [in overlying relation to said recess];

a metering bore formed in said adaptor *means* so that filtered fluid flowing out of said filter outlet means is introduced into said recess through said metering bore; [and]

*a reservoir formed between said exterior surface of said bottom wall and said adaptor means;* said [recess] *reservoir* being in fluid communication with the passageway means formed in said chimney means so that fluid that enters said [recess] *reservoir* through said metering bore is constrained to exit said [recess] *reservoir* through said passageway means.

14. The apparatus of claim 13, wherein said bottom wall includes a central hub integrally formed therewith that protrudes upwardly toward said closure means and which is positioned radially inwardly of said pair of chimney members.

15. The apparatus of claim 14, wherein said central hub is hollow and wherein said central hub slidably receives a heating element therein, said heating element being connected to a source of electrical power so that it heats said central hub and said bottom wall.

16. The apparatus of claim 15, further comprising a tubular member integral with said closure means, said tubular member extending radially outwardly from said closure means in coplanar relation thereto, whereby said tubular member receives electrical leads from a source of electrical power, said leads being connected to said heating element.

17. The apparatus of claim 16, further comprising an annular seal positioned between a top wall of said filter means and a lowermost end of said depending side walls to constrain fluid flowing into said canister to flow into said filter housing.

18. The apparatus of claim 17, wherein said canister and said filter housing are cylindrical in configuration and have a common diameter.

19. A fluid reclamation device, comprising:

a filter means having a hollow main body, a filter media positioned within said hollow main body, an inlet, and an outlet;

a canister having a hollow interior;

said hollow interior providing an evaporation chamber;

an adaptor means for detachably securing said filter means to said canister so that said filter means may be replaced as needed without disassembly of said canister;

said adaptor means including [a flat main body part and] a tubular neck depending therefrom;

said filter means having a top wall and a central recess formed in said top wall;

said central recess being specifically configured and dimensioned to receive said tubular neck;

said tubular neck and said central recess being releasably secured to one another so that said filter means is readily attachable to and detachable from said canister; and fluid passage means for enabling fluid to flow from said filter means into said evaporation chamber defined by said canister.

20. The device of claim 19, wherein said tubular neck is externally threaded and wherein said central recess is internally threaded.

* * * * *